Figure 1:
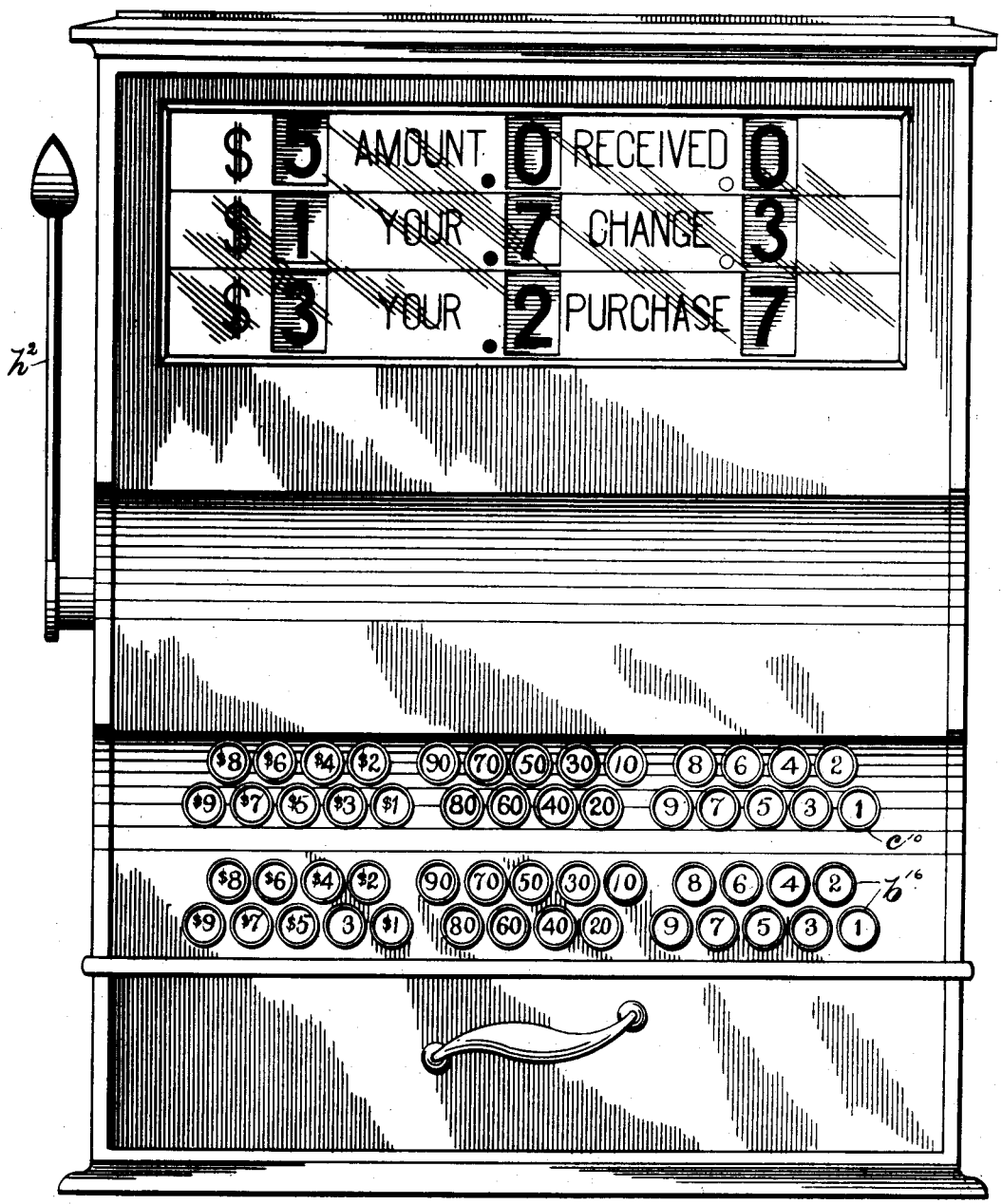

No. 869,982.  
PATENTED NOV. 5, 1907.

J. PFEIFER.  
CASH INDICATOR.  
APPLICATION FILED DEC. 13, 1902.

5 SHEETS—SHEET 1.

WITNESSES:

INVENTOR

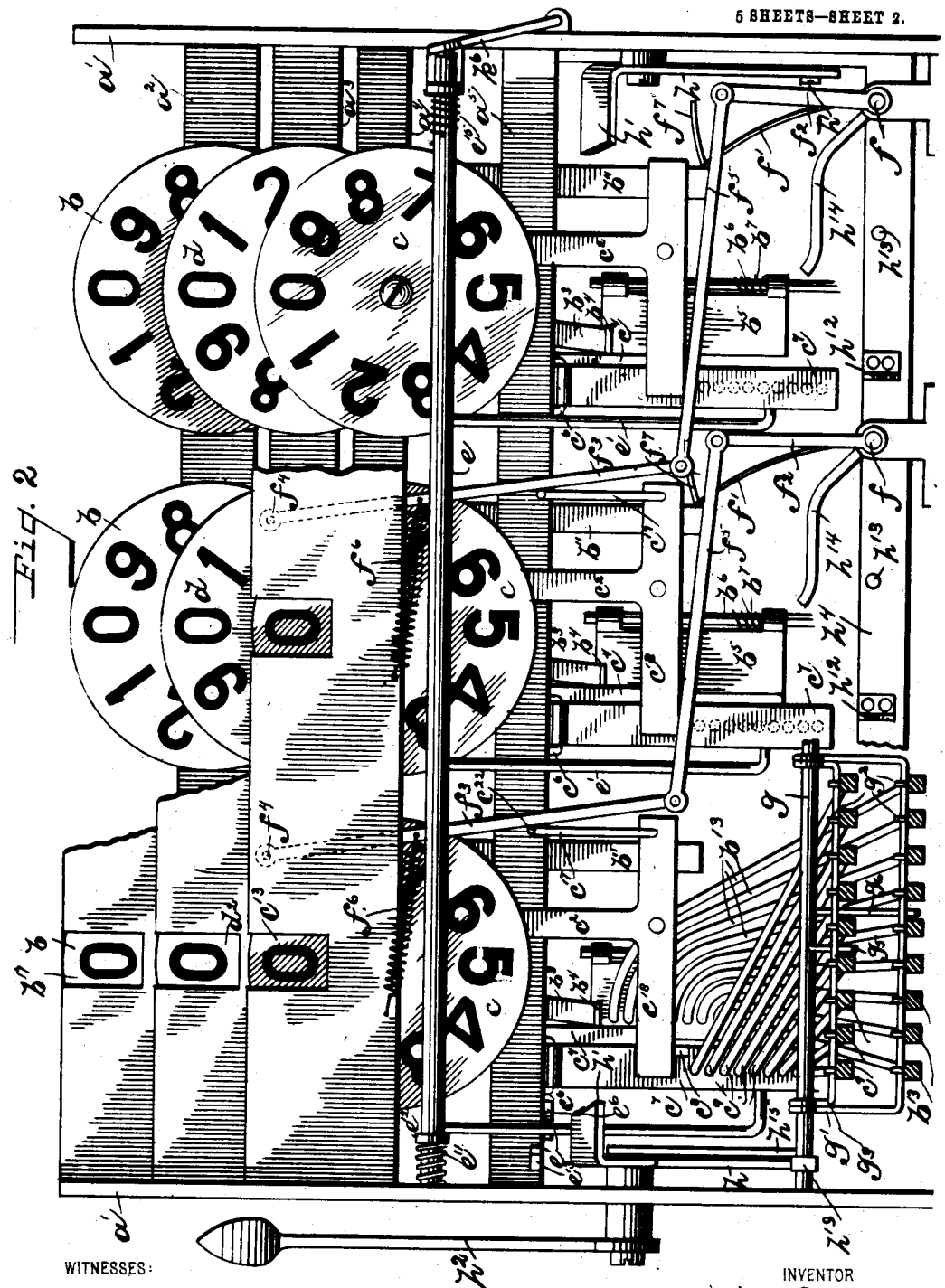

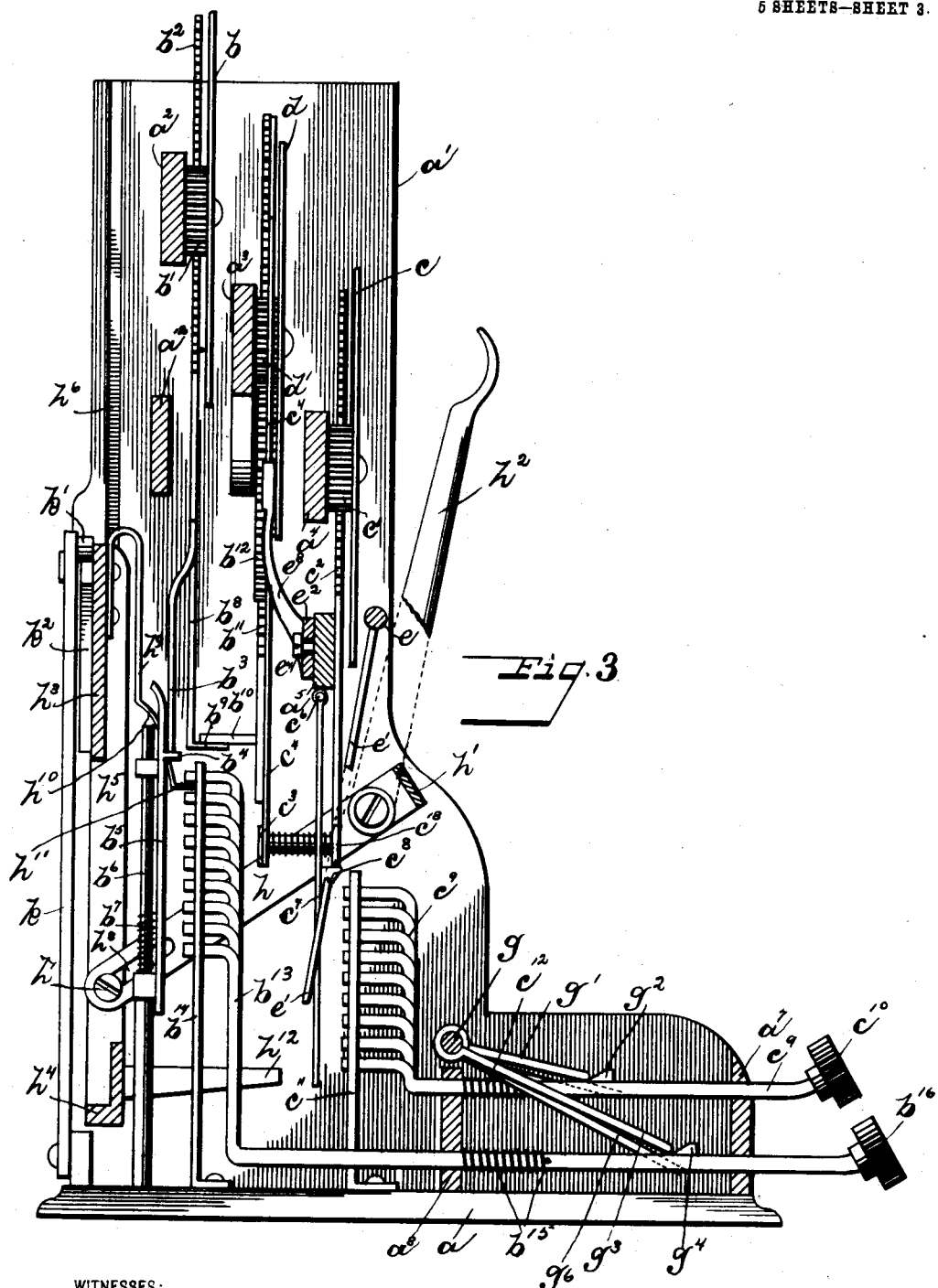

No. 869,982. PATENTED NOV. 5, 1907.
J. PFEIFER.
CASH INDICATOR.
APPLICATION FILED DEC. 13, 1902.
5 SHEETS—SHEET 4.
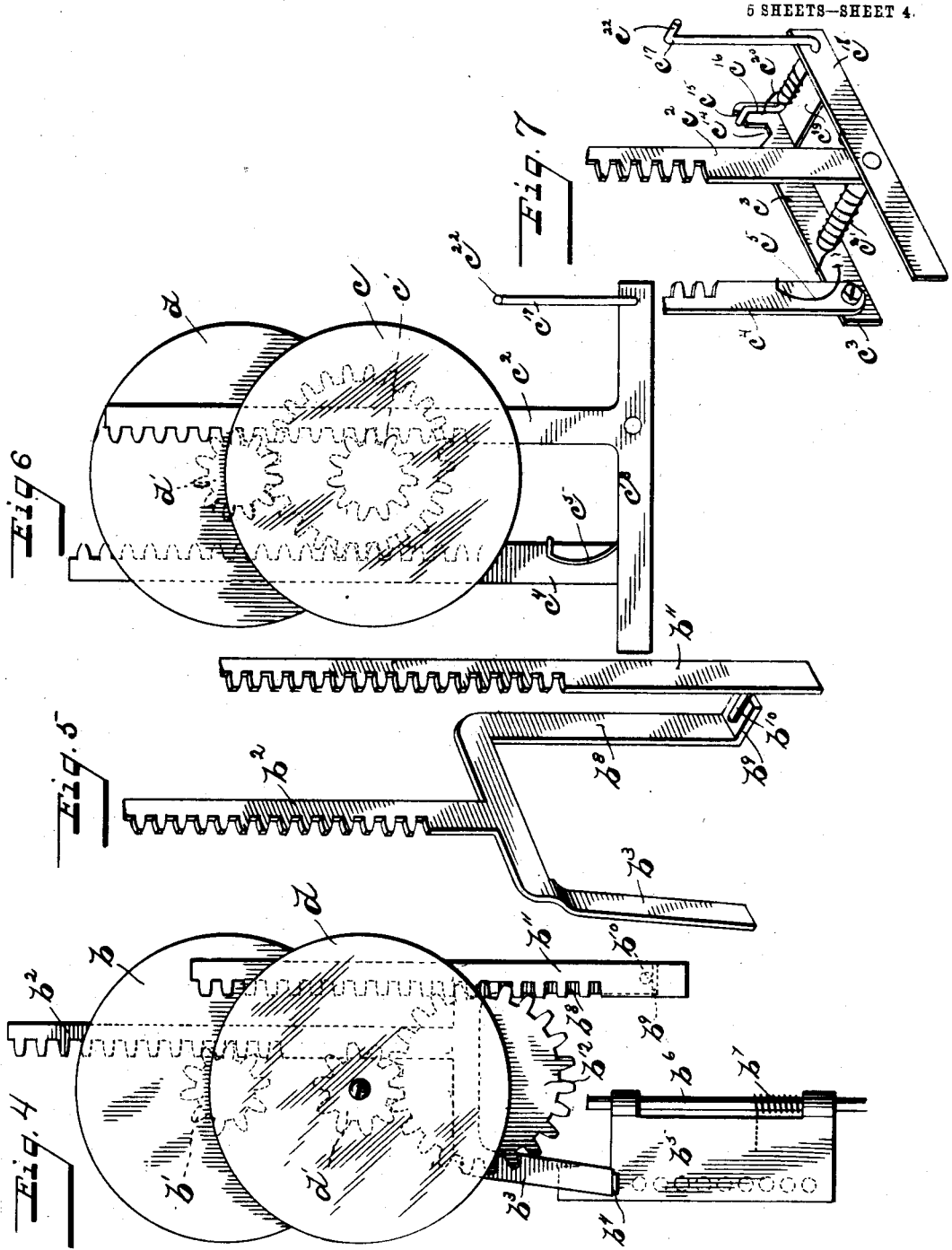

No. 869,982. PATENTED NOV. 5, 1907.
J. PFEIFER.
CASH INDICATOR.
APPLICATION FILED DEC. 13, 1902.
5 SHEETS—SHEET 5.
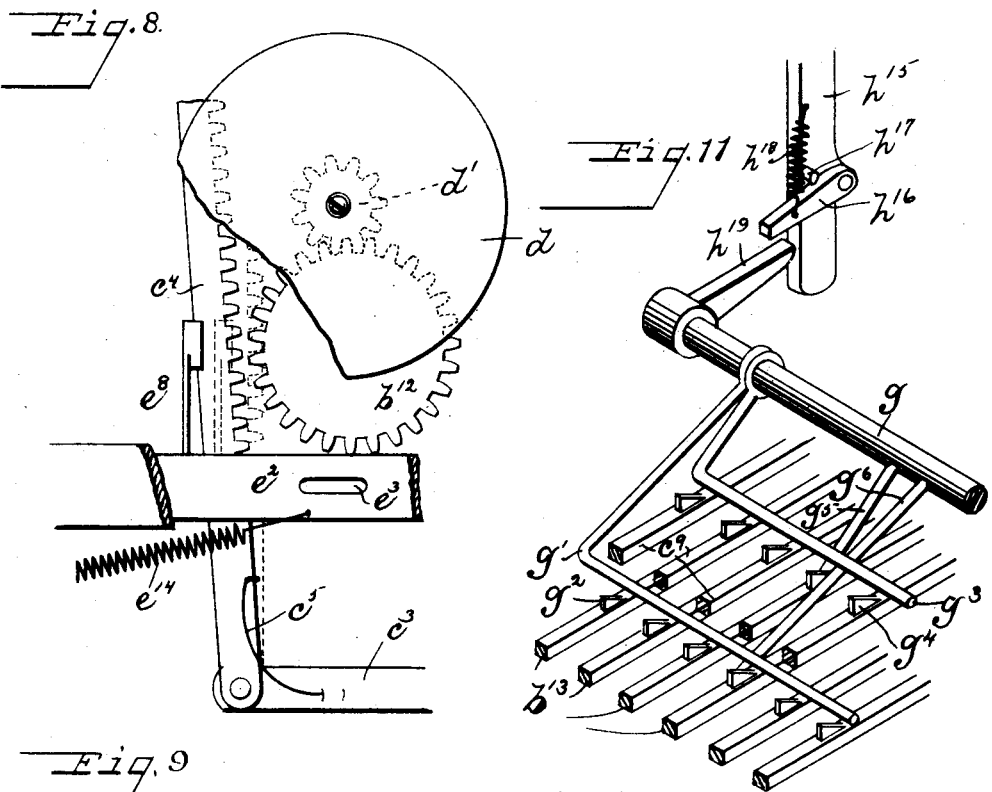
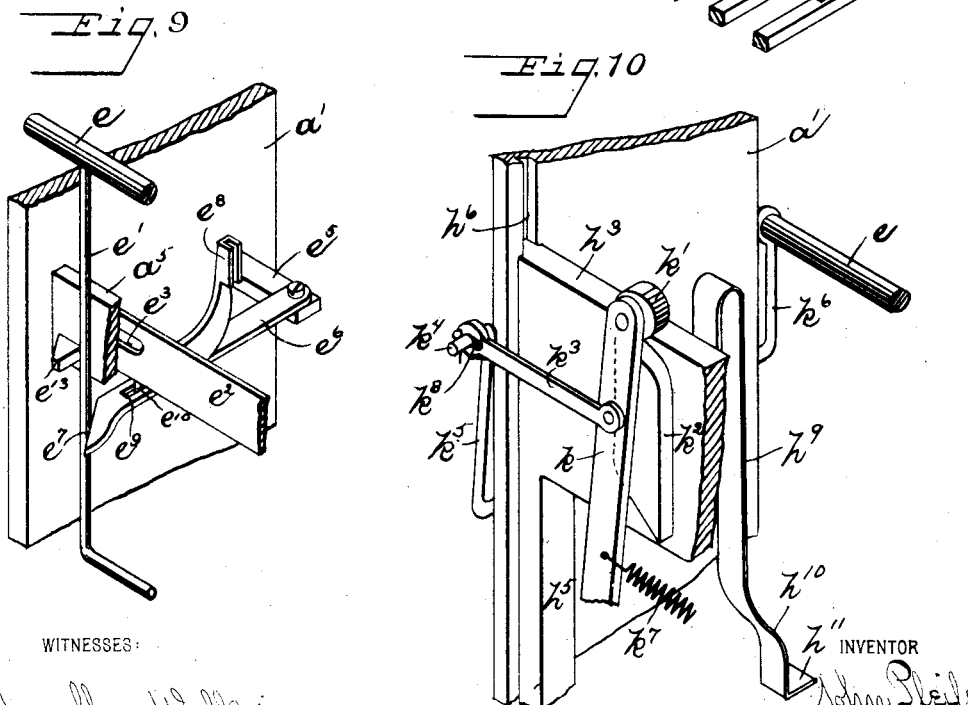

UNITED STATES PATENT OFFICE.

JOHN PFEIFER, OF SPRINGFIELD, OHIO.

CASH-INDICATOR.

No. 869,982.  Specification of Letters Patent.  Patented Nov. 5, 1907.

Application filed December 13, 1902. Serial No. 135,058.

*To all whom it may concern:*

Be it known that I, JOHN PFEIFER, a citizen of the United States, residing at Springfield, in the county of Clark and State of Ohio, have invented certain new and useful Improvements in Cash-Indicators, of which the following is a specification.

My invention relates to cash registers and money changers and more particularly to a machine for automatically calculating and indicating a cash transaction wherein a greater amount is tendered than the amount of the purchase; and as it will appear, my invention may be combined with cash registers and money changers of any well known type now in general use.

The object of my invention is to provide a machine that, in a given transaction, will indicate the amount tendered, the amount of the purchase, as well as the difference to be returned in change.

A further object is to provide an improved form of transfer mechanism whereby the amount of the purchase may be subtracted from the amount tendered and the difference correctly indicated.

My invention consists of the constructions and combinations hereinafter described and set forth in the claims.

In the accompanying drawings which form a part of this specification, Figure 1 is a front elevation of a machine embodying my invention. Fig. 2 is a like elevation with the outside casing removed, with some of the parts omitted and others broken away to more clearly show the construction. Fig. 3 is a cross section of the machine, some of the parts being omitted for clearness. Figs. 4 and 5 are details of the cash and change indicators with operating and idler racks for same. Figs. 6 and 7 are like details of the change and purchase indicators. Fig. 8 is a detail showing the operating rack for the change indicator thrown out of gear. Fig. 9 shows a detail for throwing it into gear, and Fig. 10 for throwing it out of gear. Fig. 11 is a detail of means for locking the key-rods.

Like parts are represented by similar letters of reference in the several views.

To illustrate my invention I have shown a machine employing three banks of keys with indicators and necessary connections for the respective banks arranged in a suitable frame. Each bank is provided with two sets of keys for the purpose hereinafter described, and to distinguish them I will call one set "cash" and the other "purchase" keys.

The sides, $a^1$, of the frame are supported by the base, $a$, and are connected by cross-pieces, $a^2$, $a^3$, $a^4$, and $a^5$. The indicators I have preferably shown in the form of disks having figures from 0 to 9 thereon in the usual manner. Said disks each have an operating pinion attached thereto, both disk and pinion being mounted on spindles attached to said cross-pieces. Disks, $b$, with pinions, $b^1$, attached thereto I have shown mounted on the cross-piece, $a^2$, to indicate the amout received; disks, $c$, with pinions, $c^1$, attached thereto I have shown mounted on the cross-piece, $a^4$, to indicate the amount of the purchase, and disks, $d$, with pinions, $d^1$, I have shown mounted on the cross-piece, $a^3$, to indicate the difference between the amount received and the amount of the purchase or the amount of change due the purchaser. In suitable guides on the cross-piece, $a^2$, I mount racks, $b^2$, adapted to mesh with the pinions, $b^1$, of the indicators, $b$, said racks being provided at their lower ends with bifurcated frames, one arm, $b^3$, of which is adapted to normally rest on a projection, $b^4$, of swinging plates, $b^5$, hinged to uprights, $b^6$, fixed in the base of the frame and having springs, $b^7$, to normally hold the frames, $b^5$, in position for the arms, $b^3$, to rest on the projection, $b^4$. The other arm, $b^8$, of said bifurcated frame is provided with a lateral projection, $b^9$, in the path of pins, $b^{10}$, fixed to idler racks, $b^{11}$, which slide in suitable guides on the cross-piece, $a^3$, and are adapted to mesh with idler gears, $b^{12}$, mounted on spindles secured to projections on the cross-piece, $a^3$, said idler gears being adapted to mesh with the pinions, $d^1$, of the disks, $d$.

The keys, $b^{13}$, which I call the cash keys, as heretofore indicated, and which are preferably in the form of rods having buttons, $b^{16}$, at their outer ends to indicate their value, are mounted on suitable slides in the cross-pieces, $a^7$ and $a^8$, and extend rearwardly through perforated bars, $b^{14}$, attached to the base of the frame. They are held in normal position by springs, $b^{15}$, and terminate in their normal position within sufficient distance of the swinging-plates, $b^5$, so that when a cash key is depressed it will contact with and move the swinging plate, thus moving the projection, $b^4$, out of the path of the arm, $b^3$, and permitting the racks, $b^2$, to fall until arrested by the end of the key-rod that has been depressed. This movement of the racks, $b^2$, which mesh with the pinions, $b^1$, on the indicators, $b$, will turn said indicators to display a number of like value to the number of the key depressed; and the idler racks, $b^{11}$, resting on the projection of the arm, $b^8$, will also drop a like distance with the racks, $b^2$, and through the idler gears, $b^{12}$, and pinions, $d^1$, will turn the disks, $d$, to display a like number as the disks, $b$.

I will now proceed to describe the operation of the purchase keys and their disks, and, in this connection, the further movement of the disks, $d$, to display the amount of change due the purchaser.

In suitable guides on the cross-pieces, $a^4$ and $a^5$, I mount racks, $c^2$, adapted to mesh with the pinions, $c^1$, on the disks, $c$. Said racks are provided at their lower ends with frames which I will more fully describe when I come to a description of the transfer mechanism. It is sufficient now to say that to one end of a pivoted bar, $c^3$, of said frames, I pivot racks, $c^4$, adapted to mesh with the idler gears, $b^{12}$, opposite the idler racks, $b^{11}$. Springs, $c^5$, normally hold the racks, $c^4$, out of mesh with the idler gears, $b^{12}$. I hinge at $c^6$, to the cross-piece, $a^5$, a downwardly projecting swinging-plate, $c^7$, having a lateral projection, $c^8$, on which the bar, $c^{18}$, of the frame at the lower end of the rack, $c^2$, normally rests.

The keys, $c^9$, which I call the "purchase" keys, as heretofore indicated, and which are preferably in the form of rods having buttons, $c^{10}$, at their outer ends to indicate their value, are mounted in suitable slides in the cross-pieces, $a^7$ and $a^8$, and extend rearwardly through perforated bars, $c^{11}$, attached to the base of the frame. They are held in normal position by springs, $c^{12}$, and terminate in their normal position within sufficient distance of the swinging-plate, $c^7$, so that when a purchase key is depressed it will contact with and move said frame, thus moving the projection, $c^8$, out of the path of the bar, $c^3$, and permitting the racks, $c^2$ and $c^4$, to fall until arrested by the end of the key-rod that has been depressed. This movement of the racks, $c^2$, which mesh with the pinions, $c^1$, of the indicators, $c$, will turn said indicators to display a number of like value to the number of the key depressed; and the racks, $c^4$, dropping an equal distance and being then in mesh with the idler gears, $b^{12}$, as will be hereinafter described, said gears meshing with the pinions, $d^1$, of the indicators, $d$, will turn said indicators in a reverse direction to the direction they have been previously turned by the dropping of the idler racks, $b^{11}$, a sufficient distance to display a value equal to the difference between the value of the cash and purchase key depressed, thus indicating the change due the purchaser. If, for instance, a cash key of the value of 9 is depressed, 9 will be displayed by both the cash and change indicators; but when a purchase key of the value of 6 is depressed the purchase indicator will display 6 and the change indicator will be turned back six notches to display 3. It will be understood the racks, pinions and idler gears are so adapted that in their movement they will turn the disks to display, through the openings, $b^{17}$, $c^{13}$ and $d^2$, in the frame, the proper numerals for the keys depressed.

The parts which I have thus far described are alike in each bank of the machine. I now come to a description of parts which affect the several banks.

A shaft, $e$, extends transversely across the machine and is journaled in the side frames, $a^1$, and has downwardly projecting arms, $e^1$, spring-pressed outwardly by springs $e^{15}$, the lower ends of said arms being turned to contact with the rear sides of the swinging-plates, $c^7$, of each bank. A cross-bar, $e^2$, is provided with longitudinal slots, $e^3$, through which screws, $e^4$, are attached to the cross-piece, $a^5$, permitting a longitudinal movement of said bar. Laterally projecting arms, $e^8$, attached to said bar, $e^2$, engage the rack bars, $c^4$, in each bank. Pivoted to an arm, $e^5$, of the side frame, I provide a lever, $e^6$, beveled at its forward end, $e^7$, to engage the arm, $e^1$, and having a slot, $e^9$, to engage a pin, $e^{10}$, of the cross-bar, $e^2$. The shaft, $e$, is capable of longitudinal movement and is spring-pressed in a direction to press the arm, $e^2$, against the lever, $e^6$, by a spring, $e^{11}$, interposed between the side frame and a collar, $e^{12}$. A stop, $e^{13}$, is provided to limit the movement of the shaft, $e$, in the opposite direction, which movement is given by the means hereinafter described.

The construction is such that whenever a purchase key in any of the banks is depressed it will, through the arms, $e^1$, and the lever, $e^6$, move the cross-bar, $e^2$, so that the arms, $e^8$, will engage the rack-bars, $c^4$, and throw them into mesh with the idler wheels, $b^{12}$, to turn the change indicators back to indicate the change due the purchaser, as hereinbefore described.

I now come to a description of the transfer mechanism, whereby the amount of the purchase may be subtracted from the amount tendered and said amounts, as well as the difference indicated, when it is necessary to carry units of a lower denomination to those of a higher denomination.

Referring to the frame at the lower end of the rack bars, $c^2$, which I have described as having pivoted bars, $c^3$, with racks, $c^4$, pivoted at one end thereof, the other end of said bar is provided with a notch, $c^{14}$, and a shoulder, $c^{15}$, on which one arm, $c^{16}$, of a crank, $c^{17}$, normally rests, said crank being journaled in the bar, $c^{18}$, and a cross-plate, $c^{19}$, and being provided with a spring, $c^{20}$, to hold it in normal position on said shoulder. When the arm, $c^{16}$, is moved, as hereinafter described, a spring, $c^{21}$, draws the rack-bar, $c^4$, down until the crank-arm, $c^{16}$, rests in the bottom of the notch, $c^{14}$, for the purpose of moving the change indicator one additional figure. It is obvious the rack bar, $c^4$, will drop by its own weight; but the spring, $c^{21}$, is preferably provided to assist in the operation. The construction just described is in both the tens and hundreds banks but obviously it is not necessary in the units bank. The crank, $c^{17}$, is moved as stated in the following manner: Rearwardly extending shafts, $f$, for the units and tens banks are journaled in the frame of the machine and are provided with upwardly extending arms, $f^1$, the outer ends of which rest against the lower ends of the idler racks, $b^{11}$, said racks being adjusted to the idler gears so that when the change indicator passes the numeral 9 and indicates zero, the idler rack will be elevated to such height that the arms, $f^1$, will be released. Levers, $f^2$, fixed to the shafts, $f$, and levers, $f^3$, pivoted at $f^4$ to the frame of the machine, are pivoted together by a link, $f^5$. When the arms, $f^1$, are released, as described, springs, $f^6$, draw the levers, $f^3$, against arms, $c^{22}$, of cranks, $c^{17}$, of the next higher denomination, which throws the arm, $c^{16}$, into the notch, $c^{14}$, for the purpose of allowing the rack, $c^4$, to move the change indicator of the next higher denomination one figure, as hereinbefore described. Laterally extending arms, $f^7$, on the arms, $f^1$, arrest the idler racks after the arms, $f^1$, have been released and permit their return to normal position, as hereinafter described.

For the purpose of locking the keys in their depressed position, I provide a transverse shaft, $g$, suitably journaled in the frame and extending across all the banks of the machine, and I journal on this shaft rocking detents, $g^1$, for each bank, to engage lugs or stops, $g^2$, of the cash keys; and I also journal on said shaft rocking detents, $g^3$, for each bank, to engage lugs or stops, $g^4$, of the purchase keys; and I further provide said shaft with laterally projecting fingers, $g^5$ and $g^6$, extending under said detents to lift them out of engagement with said stops by turning the shaft, $g$, in the manner hereinafter described.

The several parts and devices are returned to their normal position by the following described mechanism. Tilting levers, $h$, are pivoted to the respective side frames of the machine, their front ends being joined by a cross-bar, $h^1$, said levers and cross-bar being preferably in one U-shaped piece as shown; and an operating handle, $h^2$, is fixed to the front end of one of said levers. A vibrating-frame having cross-pieces, $h^3$ and $h^4$, and end-pieces or uprights, $h^5$, adapted to slide in suitable guides, $h^6$, in the respective side frames of the machine, are connected with the levers, $h$, by screws, $h^7$, working in slots, $h^8$, of the respective levers. Downwardly-projecting fingers, $h^9$, having shoulders, $h^{10}$ and $h^{11}$, extend from the cross-piece, $h^3$, so that when the vibrating frame and the bifurcated frame of the racks, $b^1$, are in their lowest position, the shoulder, $h^{11}$, will engage the bifurcated frame and lift it until the arm, $b^3$, of the bifurcated frame rests on the projection, $b^4$, of the swinging-plate, $b^5$, and the vibrating frame continuing its upward movement, the shoulder, $h^{10}$, engages a cross-piece, $a^{12}$, and the fingers, $h^9$, are moved out of the path of the bifurcated frame and the racks, $b^1$, and the idler racks, $b^{11}$, are free to fall when the swinging plate, $b^5$, is moved, as hereinbefore described. Forwardly projecting fingers, $h^{12}$, attached to the cross-piece, $h^4$, extend under the frame carrying the racks, $c^2$ and $c^4$, so that when the vibrating frame is elevated it will carry said racks upwardly until a bar of the frame for said racks rests on the projection, $c^8$, of the swinging-plate, $c^7$. The lever can then be released and it and the vibrating frame will return to their normal positions by gravity.

The transfer mechanism is returned to normal position by means of forwardly projecting pins, $h^{13}$, extending from the cross-piece, $h^4$, which engage laterally projecting arms, $h^{14}$, fixed to the shafts, $f$, so that when the vibrating frame is elevated it will throw the arms, $f^1$, on said shaft back into normal position to be held by the idler racks, $b^{11}$.

I will now describe the means employed to move the shaft, $e$, longitudinally against the tension of the spring, $e^{11}$, to permit the springs, $c^5$ and $e^{14}$, to operate to throw the rack-bars, $c^4$, out of engagement with the idler gears, $b^{12}$, the spring, $e^{11}$, being of greater strength than the spring $e^{14}$.

On the rear side of the base of the frame of the machine I pivot an upright, $k$, the upper end of which I provide with a lateral projection, preferably in the form of a roller, $k^1$, which, when the vibrating frame is operated, will engage and travel around a cam, $k^2$, fixed to the cross-piece, $h^3$, of said frame. A link, $k^3$, pivoted to said upright, is pivoted at its other end to an arm, $k^4$, of a crank, $k^5$, in suitable journals on a side frame of the machine, the other arm, $k^6$, of said crank contacting with an end of the shaft, $e$, so that when the pivoted upright is moved by the travel of the roller, $k^1$, about the cam, $k^2$, the arm, $k^6$, will move the shaft, $e$, longitudinally against the tension of the spring, $e^{11}$, and thereby permit the racks, $c^4$, to be thrown out of engagement as described. A spring, $k^7$, attached to the upright, $k$, tends to pull the roller, $k^1$, over the top center of the cam in one direction and the link, $k^3$, being under tension of the spring, $e^{11}$, tends to pull said roller over the bottom center of the cam in the opposite direction and in this manner the roller is guided in its travel about said cam. But as the spring, $e^{11}$, is much stronger than the spring, $k^7$, the link, $k^3$, is provided with an elongated slot, $k^8$, where it is pivoted to the arm, $k^4$, of the crank, so that when the roller passes over the top center of the cam the spring, $e^{11}$, is not exerting any tension on the pivoted upright.

For the purpose of unlocking the keys when held in their depressed position by the rocking detents on the shaft, $g$, I attach to the forward end of one of the tilting levers, $h$, a downwardly projecting bar, $h^{15}$, to which I pivot an arm, $h^{16}$, the free end of which is held in normal position against a pin, $h^{17}$, by a spring, $h^{18}$. The free end of said arm, $h^{16}$, in its normal position extends over the end of an arm, $h^{19}$, fixed to the shaft, $g$, so that when the bar, $h$, is depressed by moving the operating handle the arm, $h^{16}$, will contact with the arm, $h^{19}$, and turn the shaft, $g$, and the fingers, $g^5$ and $g^6$, fixed to said shaft will lift the rocking detents, $g^1$ and $g^3$, out of engagement with the lugs or stops, $g^2$ and $g^4$, of the keys, springs, $c^{12}$ and $b^{15}$, returning said keys to normal position. The spring, $h^{18}$, permits the arm, $h^{16}$, in its return movement to pass the arm, $h^{19}$.

The buttons, $b^{16}$, on the cash keys, $b^{13}$, and the buttons, $c^{10}$, on the purchase keys, $c^9$, have like numerals thereon, the numerals in the units bank being from 1 to 9 inclusive, the numerals in the tens bank being 10 and multiples of 10 up to and including 90 and the numerals of the hundreds bank being from 1 to 9 inclusive, all as shown in Fig. 1.

The operation of the machine is as follows: Take, for example, the transaction indicated in Fig. 1, wherein a purchase amounting to $3.27 has been made and $5.00 tendered, the difference, $1.73, to be returned in change. If the previous transaction on the machine has not been canceled, the vibrating frame is first elevated by depressing the handle, $h^2$, the several racks in the respective banks are carried up and the indicators all set at zero; said racks being retained in their positions by the respective catches before described. All the other parts of the machine will likewise be returned to their normal positions in the manner before described. Upon releasing the lever, the lever and frame will return back to their normal positions by gravity. Then depressing the $5.00 cash key, $b^{13}$, of the hundreds bank, the rack, $b^2$, will drop until arrested by the end of said key and the cash or amount received indicator will display 5; and the idler racks, $b^{11}$, falling a like distance with the rack, $b^2$, will turn the idler gear, $b^{12}$, and cause the change indicator, $d$, to also display 5. Now depress the 3 purchase key, $c^9$, of the hundreds bank, the 20 purchase key of the tens bank and the 7 purchase key of the units bank and the racks, $c^2$ and $c^4$ of each bank will be released and will drop until arrested by the ends of the key-rods of the keys depressed, the racks, $c^2$, thus turning the purchase indicators, $c$, to display $3.27; and the racks, $c^4$, of the several banks will operate as follows. The rack, $c^4$, of the units bank will turn the change indicator of that bank from zero to display the numeral 3 and in so doing the idler rack of said bank will be lifted to release the transfer arm, $f^1$, so that the arm, $c^{1,6}$ of the crank, $c^{17}$, will be thrown into the notch, $c^{14}$, of the pivoted bar, $c^3$, permitting the rack-bar, $c^4$, of the tens bank to drop such additional distance as to operate the change indicator of that bank to the extent of an additional figure and thus display the numeral 7. This last described movement will lift the idler rack of the tens bank and in like manner permit the rack-bar, $c^4$, of the hundreds bank to drop an increased distance to the extent of one figure. It will be remembered that upon the depression of the $5.00 cash key the idler rack has moved the idler gear in one direction to cause the change indicator of this bank to display 5; and the depression of the $3.00 purchase key, would cause the rack, $c^4$, to normally turn the idler gear in the opposite direction sufficiently to cause the change indicator to display the figure 2, but the rack, $c^4$, being given an increased drop to the extent of one figure, the numeral 1 will be displayed; and thus by the operation described the indicators display the amount received, $5.00, the amount of the purchase, $3.27, and the difference or amount of change, $1.73.
I have shown the indicators in the form of disks; but it is obvious I may employ other forms of indicators and I do not wish to be understood as limiting myself to the form of indicators shown.

Having thus described my invention, I claim:—

1. The combination with indicators of operating devices and intermediate mechanism adapted to move upon being released by said devices, whereby two amounts of an individual transaction and their difference will be displayed, and means to return said devices to normal position, substantially as specified.

2. The combination with an indicator for amount received, an indicator for amount purchased, and an intermediate indicator adapted to be operated in one direction by the first mentioned indicator and in the opposite direction by the second mentioned indicator, means for holding same in indicating position and means for simultaneously returning all indicators to normal position, for the purpose specified.

3. The combination of one set of indicators and a second set of indicators located below the first set of indicators, an intermediate set of indicators operated in one direction by the first mentioned indicators and operated in the opposite direction by the second mentioned indicators and means for simultaneously returning all indicators to normal position, for the purpose specified.

4. The combination of an indicator for the purpose of indicating one part of a transaction, a second indicator for the purpose of indicating another part of the same transaction, and an intermediate indicator for indicating the differences in the two parts of said transaction, means for operating said last mentioned indicator in unison with said first mentioned indicator and means for reversing the movement of said last mentioned indicator and moving same in unison with said second mentioned indicator, means for holding said indicators in indicating position but adapted to permit all to be returned simultaneously, for the purpose specified.

5. In a cash register, the combination of an indicator for indicating one part of a transaction, with a second indicator for indicating another part of the same transaction, an intermediate indicator located between said first and second indicators and adapted to indicate the difference between the amounts or numbers indicated by the first indicator and that indicated by the second indicator, means for moving said intermediate indicator in one direction in unison with said first indicator and for moving same in the opposite direction in unison with said second indicator, means for holding all said indicators in indicating position, and means for returning same simultaneously to normal position, for the purpose specified.

6. The combination with indicators, of two sets of finger keys of like value, and intermediate mechanism common to all and adapted to be controlled in part by each of said keys, said mechanism including means adapted to move one of said indicators in opposite directions, whereby upon the successive depression of a key in each set, two amounts of like value with the key depressed and their difference will be displayed, substantially as specified.

7. The combination with indicators, of two sets of finger keys of like value, and intermediate mechanism common to all and adapted to be controlled in part by each of said keys, said mechanism including racks adapted to move one of said indicators in opposite directions, whereby upon the successive depression of a key in each set two amounts of like value with the keys depressed and their difference will be displayed, substantially as specified.

8. The combination with indicators, of two sets of finger keys of like value, and intermediate mechanism common to all and adapted to be controlled in part by each of said keys, said mechanism including racks adapted to move one of said indicators in opposite directions, one of said racks adapted to move in and out of operative relation, whereby upon the successive depression of a key in each set two amounts of like value with the keys depressed and their difference will be displayed, substantially as specified.

9. The combination with indicators and self-acting actuating mechanism therefor, of two sets of finger keys of like values adapted to release and control said mechanism, whereby upon the successive depression of a key in each set, two amounts of like value with the keys depressed and their difference will be displayed, substantially as specified.

10. The combination with indicators, of two sets of finger keys of like value, and self-acting intermediate mechanism common to all and adapted to be released and controlled by each of said keys, whereby upon the successive depression of a key in each set, two amounts of like value with the keys depressed and their difference will be displayed, substantially as specified.

11. The combination with indicators, of two sets of finger keys of like value, and intermediate mechanism adapted to move upon being released by said keys, whereby upon the depression of a key in each set, two amounts of like value with the keys depressed and their difference will be displayed, and means to return said mechanism to normal position, substantially as specified.

12. The combination with indicators, of two sets of finger keys of like value and intermediate mechanism adapted to move upon being released by said keys, said mechanism being common to all of said keys and limited in its movement thereby, whereby upon the depression of a key in each set, two amounts of like value with the keys depressed and their difference will be displayed, and means to return said mechanism to normal position, substantially as specified.

13. The combination with indicators, of two sets of finger keys, and intermediate mechanism, controlled by said keys, operating by gravity to move said indicators, means to hold said mechanism in an elevated position, and means to release said mechanism, whereby two amounts and their difference will be displayed by said indicators.

14. The combination with indicators, of two sets of finger keys and intermediate mechanism, operating by gravity to move said indicators, means to hold said mechanism in an elevated position, and a movable frame to elevate and release said mechanism subject to the control of said keys, whereby two amounts and their difference will be displayed by said indicators.

15. The combination with indicators, of two sets of finger keys, intermediate mechanism, operating by gravity to move said indicators, including means adapted to move one of said indicators in opposite directions, means to hold said mechanism in an elevated position, devices to elevate and release said mechanism, subject to the control of said keys, whereby two amounts and their difference will be displayed by said indicators.

16. The combination with indicators, of two sets of finger keys, intermediate mechanism, controlled by the depression of said keys, operated by gravity to move said indicators, devices to hold said keys in their depressed position and said mechanism in an elevated position, means to elevate and release said mechanism subject to the control of said keys, and devices to release and return said keys, whereby two amounts and their difference will be displayed by said indicators.

17. The combination with units, tens and hundreds banks of keys, each bank consisting of a set of cash keys and a set of purchase keys of like value, of indicators for each of said banks representing corresponding values, and intermediate mechanism, including devices adapted to carry units of a lower denomination to those of a higher denomination, whereby upon the successive depression of a cash key and a purchase key in any one or more of the respective banks, two amounts of like value with the cash and purchase keys depressed and the amount of their difference will be displayed by said indicators.

18. The combination with units, tens and hundreds banks of keys, each bank consisting of a set of cash keys and a set of purchase keys of like values, of indicators for each of said banks representing corresponding values, intermediate mechanism to normally move said indicators in accordance with the keys depressed and adapted at predetermined intervals to move one of the indicators for the tens and hundreds banks an additional distance, whereby upon the successive depression of a cash key and a purchase key in any one or more of the respective banks, two amounts of like value with the cash and purchase keys depressed and the amount of their difference will be displayed by said indicators.

19. The combination with units, tens and hundreds banks of keys, each bank consisting of a set of cash keys and a set of purchase keys of like values, of indicators for each of said banks representing corresponding values, intermediate mechanism, including devices adapted to normally move one of the indicators in each bank in opposite directions in accordance with the value of the cash and purchase keys depressed, and adapted at predetermined intervals to move said last named indicators for the tens and hundreds banks an additional distance, whereby upon the successive depression of a cash key and a purchase key in any one or more of the respective banks, two amounts of like value with the cash and purchase keys depressed and the amount of their difference will be displayed by said indicators.

20. The combination with units, tens and hundreds banks of keys, each bank consisting of a set of cash keys and a set of purchase keys of like values, of indicators for each of said banks representing corresponding values, intermediate mechanism, including devices to normally move one of the indicators in each bank in opposite directions in accordance with the value of the cash and purchase key depressed, one number of said devices in each bank being adapted to engage and disengage with said last named indicators and at predetermined intervals to move an additional distance, whereby upon the successive depression of a cash key and a purchase key in any one or more of the respective banks, two amounts of like value with the cash and purchase keys depressed and the amount of their difference will be displayed by said indicators.

21. The combination with units, tens and hundreds banks of keys, each bank consisting of a set of cash keys and a set of purchase keys of like values, of indicators for each of said banks representing corresponding values, intermediate mechanism operated by gravity to move said indicators and adapted to carry units of a lower denomination to those of a higher denomination, means to hold said mechanism in an elevated position, and devices to elevate and release said mechanism subject to the control of said keys, whereby upon the successive depression of a cash and purchase key in any one or more of said banks and the release of said mechanism, two amounts and their difference will be displayed by said indicators.

22. The combination with units, tens and hundreds banks of keys, each bank consisting of a set of cash keys and a set of purchase keys of like values, of indicators for each of said banks representing corresponding values, intermediate mechanism operated by gravity to move said indicators, two members of said mechanism in each bank adapted to normally move one indicator in their respective banks in opposite directions in accordance with the cash and purchase keys depressed, one of said members being adapted to engage and disengage with said last named indicators and at predetermined intervals to move an additional distance, means to hold said mechanism in an elevated position, and devices to elevate and release said mechanism subject to the control of said keys, whereby upon the successive depression of a cash and purchase key in any one or more of said banks, two amounts of like value to the cash and purchase key depressed and the amount of their difference will be displayed by said indicators.

23. The combination of units, tens and hundreds banks of keys, each bank consisting of a set of cash keys and a set of purchase keys, indicators for each bank to display the amount received, the amount of purchase and the amount of change, intermediate devices between said cash keys and amount received indicators with auxiliary devices to move the change indicator in one direction, intermediate devices between said purchase keys and the amount of purchase indicators with auxiliary devices adapted to be thrown into engagement with and move said change indicators in the opposite direction, means actuated by the depression of a purchase key in any one or more banks to throw said last named auxiliary devices into engagement with all of said change indicators, and means to throw said devices out of engagement, substantially as and for the purpose specified.

24. The combination of units, tens and hundreds banks of keys, each bank consisting of a set of cash keys and a set of purchase keys, indicators for each bank to display the amount received, the amount of purchase and the amount of change, intermediate mechanism, operating by gravity, connecting the amount received indicators with said cash keys, with auxiliary devices moving therewith to move the change indicators in one direction, intermediate mechanism operated by gravity connecting the amount of purchase indicators with said purchase keys, with auxiliary devices moving therewith, adapted to be thrown into engagement with and to move said change indicators in the opposite direction, means actuated by the depression of a purchase key in any one or more banks to throw said last named auxiliary devices into engagement with all of said change indicators, means to give, at predetermined intervals, an increased movement to one or more of said last named devices, means to hold said mechanism and devices in an elevated position, and devices to elevate and release said mechanism and auxiliary devices subject to the control of said keys, whereby upon the successive depression of a cash and purchase key in any one or more of said banks, two amounts of like value to the cash and purchase keys depressed and the amount of their difference will be displayed by said indicators.

25. The combination of a set of indicators, a series of keys, a set of operating devices for said indicators released by said keys, a second set of indicators and two sets of actuating devices for said second mentioned indicators, a third set of indicators and a set of operating devices for same, means for causing said actuating devices to move in unison with each set of operating devices, and means for giving one one of the sets of said actuating devices additional predetermined movements independent of the movement of its corresponding operating device, for the purpose specified.

26. The combination of indicators and keys for different denominations, operating devices for the indicators of each denomination, a second set of indicators for different denominations and a plurality of actuating devices for each indicator, means for causing said actuating devices to move in unison with the operating devices and means for causing one of the actuating devices for each indicator above the lowest denomination to move an additional distance independent of the operating devices, for the purpose specified.

27. The combination of indicators with keys, operating devices for each indicator released by said keys, actuating devices supported by said operating devices and adapted to move therewith, a spring normally under tension for causing said actuating devices to move an additional distance, means for disconnecting the actuating and operating devices and adapted to cause said spring to give said actuating device an additional predetermined movement, and means for winding up said spring and connecting said actuating and operating devices at the end of the operation of the machine, for the purpose specified.

28. The combination with a set of indicators for indicating the amounts received, a set of operating devices for each indicator, a set of indicators for indicating amounts purchased and a set of operating devices for same, intermediate indicators for indicating the difference between said amounts, a plurality of intermediate actuating devices for each indicator, means for causing said actuating devices to move in unison with both sets of operating devices, means for disconnecting one of said actuating devices from its corresponding operating device, and means for giving said actuating device an additional movement independent of its corresponding operating device, for the purpose specified.

29. The combination of a set of indicators, a series of keys, a set of operating devices for moving said indicators, one for each indicator, an additional set of indicators and a set of actuating devices for moving said last mentioned indicators in reverse direction from the movement of said first mentioned indicators, means for causing the actuating and operating devices to move in unison and means for causing an additional movement of said last mentioned indicators in a reverse direction from the movement of the first mentioned indicators and independent of the movement of the first mentioned indicators, for the purpose specified.

30. The combination of a set of indicators, a series of keys, a set of operating devices for rotating said indicators, one for each indicator, an additional set of indicators and a set of actuating devices for said last mentioned indicators, means for causing the two sets of indicators to rotate in unison but in opposite directions, means for causing an additional movement of the last mentioned indicators independent of the first mentioned indicators, means for throwing the actuating devices out of engagement with the last mentioned indicators, for the purpose specified.

31. In a cash register, minuend indicators, subtrahend indicators, remainder indicators, means for causing the remainder indicators to move in one direction in correspondence with the minuend indicators, and then in the reverse direction in correspondence with the subtrahend indicators, and means for resetting all the indicators to zero at each operation of the machine.

32. In a machine of the character described, for temporarily indicating value received, value retained and value returned in the form of change in any special transaction, the combination of a remainder indicating drum, means for moving said drum in one direction corresponding to the minuend, and means for moving the drum in the opposite direction corresponding to the subtrahend, and means for readjusting the several indicating drums to the starting point on the beginning of an indication.

33. In a cash indicator, a set of minuend indicators, a set of subtrahend indicators, a motor for each set of indicators, a series of keys for each set of indicators adapted when depressed to release said motors to permit them to operate said indicators and determine the movement thereof, a set of remainder indicators, means for causing the remainder indicators to move in one direction in correspondence with the minuend indicators and then in a reverse direction in correspondence with the subtrahend indicators, and means for resetting all the indicators to zero and also resetting the motors at each operation of the machine.

34. In a machine having minuend indicator mechanism, a subtrahend indicator mechanism, a motor comprised in each of said mechanisms, a remainder indicator mechanism, a bank of keys for releasing and permitting the motor for the minuend indicator mechanism to operate said mechanism and determine the movement thereof, a separate bank of keys for releasing and permitting the motor for the subtrahend indicator mechanism to operate said mechanism and determine the movement thereof, and means whereby the operation of the minuend and subtrahend indicator mechanisms may operate to effect the desired adjustment of the remainder indicator mechanism.

35. In a machine of the character described for temporarily indicating value received, value retained and value returned in the form of change in any special transaction, the combination of a remainder indicator drum, a series of minuend and a series of subtrahend keys, a motor released and controlled by the minuend keys for moving said drum in one direction corresponding to the minuend, a motor released and controlled by the subtrahend keys for moving the drum in the opposite direction corresponding to the subtrahend, and means for readjusting said drum to the starting point and resetting the said motors.

36. A machine for temporarily indicating value received, value retained and value returned in the form of change in each special transaction, and consisting of a minuend indicator mechanism, a subtrahend indicator mechanism, and a remainder indicator mechanism, a series of keys for the minuend indicator mechanism and a series of keys for said subtrahend indicator mechanism, motors released and controlled by said keys for moving said minuend and subtrahend indicator mechanisms, and means whereby the operation of the minuend and subtrahend indicator mechanisms may operate the remainder indicator mechanism, and means for readjusting the several indicator mechanisms to the starting point and resetting said motors.

37. The combination with a series of keys representing the amounts of sales, a second series of keys representing the amounts paid in, a change indicator, and motors for said change indicator adapted to be released and controlled by the respective series of keys to cause said indicator to be set to a position representing the difference between the amounts set up on the respective series of keys.

In testimony whereof, I have hereunto set my hand this 21st day of November A. D. 1902.

JOHN PFEIFER.

Witnesses:
CHAS. I. WELCH,
PERCY NORTON.